US011216792B2

(12) United States Patent
Pierce et al.

(10) Patent No.: US 11,216,792 B2
(45) Date of Patent: Jan. 4, 2022

(54) APPARATUS AND METHODS FOR CONDUCTING ATM TRANSACTIONS

(71) Applicants: Terry Pierce, Rancho Cucamonga, CA (US); Kathy Snider, Sheboygan Falls, WI (US)

(72) Inventors: Terry Pierce, Rancho Cucamonga, CA (US); Kathy Snider, Sheboygan Falls, WI (US)

( * ) Notice: Subject to any disclaimer, the term of this patent is extended or adjusted under 35 U.S.C. 154(b) by 0 days.

(21) Appl. No.: 16/595,501

(22) Filed: Oct. 8, 2019

(65) Prior Publication Data
US 2020/0134584 A1 Apr. 30, 2020

Related U.S. Application Data

(63) Continuation of application No. 14/760,988, filed on Jul. 14, 2015, now Pat. No. 10,438,180.

(51) Int. Cl.
*G06Q 20/10* (2012.01)
*G07F 19/00* (2006.01)
*G06Q 20/18* (2012.01)

(52) U.S. Cl.
CPC ......... *G06Q 20/1085* (2013.01); *G06Q 20/18* (2013.01); *G07F 19/211* (2013.01)

(58) Field of Classification Search
CPC ... G06Q 20/1085; G06Q 20/18; G07F 19/211
USPC ......................................................... 705/43
See application file for complete search history.

(56) References Cited

U.S. PATENT DOCUMENTS

| 5,604,341 | A  | * | 2/1997  | Grossi ................... | G06Q 10/10 |
|           |    |   |         |                            | 235/379    |
| 7,857,207 | B1 | * | 12/2010 | Hopkins, III ......... | G07F 19/211|
|           |    |   |         |                            | 235/379    |
| 8,131,636 | B1 | * | 3/2012  | Viera .................. | G06Q 20/4016|
|           |    |   |         |                            | 705/38     |
| 8,833,639 | B1 | * | 9/2014  | Hopkins, III ...... | G06Q 20/1085|
|           |    |   |         |                            | 235/375    |
| 2006/0004660 | A1 | * | 1/2006 | Pranger ................. | G06Q 40/02 |
|           |    |   |         |                            | 705/43     |
| 2006/0169764 | A1 | * | 8/2006 | Ross ..................... | G07F 19/207|
|           |    |   |         |                            | 235/375    |
| 2012/0265679 | A1 | * | 10/2012 | Calman ................ | G07F 19/206|
|           |    |   |         |                            | 705/43     |

(Continued)

OTHER PUBLICATIONS

"First of its Kind Video ATM Comes to Missoula." Press Release. Date: Nov. 19, 2012. (Year: 2012).*

*Primary Examiner* — Sara C Hamilton
(74) *Attorney, Agent, or Firm* — J. Mark Holland & Assoc.; J. Mark Holland; Alison Adnan

(57) ABSTRACT

Apparatus and methods 10 are disclosed that provide mainline standard ATMs 12 with enhanced functionality, enabling users 16 to conduct not only conventional transactions such as deposits and/or withdrawals from checking and/or banking accounts, but more sophisticated and complicated transactions that previously have typically required an in-person interaction with a human teller or logging into the user's account via a mobile phone, personal computer, or similar device. A terminal handler 40 coordinates enrollment and verification through a database 42, and routes transactions from the ATM to the appropriate corresponding financial institution.

4 Claims, 4 Drawing Sheets

(56) References Cited

U.S. PATENT DOCUMENTS

2014/0074706 A1\* 3/2014 Paulsen ................ G06Q 20/108
705/42

\* cited by examiner

US 11,216,792 B2

APPARATUS AND METHODS FOR CONDUCTING ATM TRANSACTIONS

This application claims priority to U.S. patent application Ser. No. 14/760,988 filed Jul. 14, 2015, the disclosure of which is incorporated herein by reference in its entirety. This is a continuation-in-part of that application.

The present invention is directed to apparatus and methods for processing transactions using an automated teller machine (ATM). Certain embodiments of the invention are especially useful for transactions involving credit unions ("CUs") and their customers. Among other things, the invention provides greater functionality for users than available with prior art mainline ATMs, and for embodiments that involve a "shared branching" network of credit unions, an improved terminal handler provides improved data consolidation and reporting and communication for the relevant credit unions. In certain embodiments, the system can be run on existing hardware via a software upgrade.

Conventional ATMs typically can be used by customers and members from a variety of different banks and/or credit unions. Normally, the cardholder/user swipes a plastic card (ATM, Debit or Credit card) through a reader on the ATM, and then enters their related PIN into the ATM. The card typically has a chip or magnetic stripe or other identifying information stored on it in some manner that is readable by the ATM. Assuming that the card and PIN credentials are authorized by the ATM system, the cardholder/user is able to proceed with some relatively limited activities at the ATM (deposit/withdraw/transfer to/from one or two accounts that have been linked to the card).

The present invention is described herein with reference to the accompanying Figures, which serve as illustrations of some of the many embodiments in which the invention may be practiced. Subject to the context and other factors (including for example the understanding of persons of ordinary skill in the arts relevant to the inventions), generally in those Figures and references similar reference numerals refer to similar or identical elements throughout this description.

Those Figures and references, and the other terminology used in these descriptions, are not intended to be interpreted in any limited or restrictive manner, simply because it is being utilized in conjunction with a detailed description of certain embodiments of the invention. Furthermore, various embodiments of the invention (whether or not specifically described herein) may include one or more of the novel features disclosed herein, no single one of which (a) is necessarily solely responsible for any particular desirable attribute(s) of the inventions or (b) is essential to practicing the inventions described.

DETAILED DESCRIPTION OF EMBODIMENTS

Figure 1:
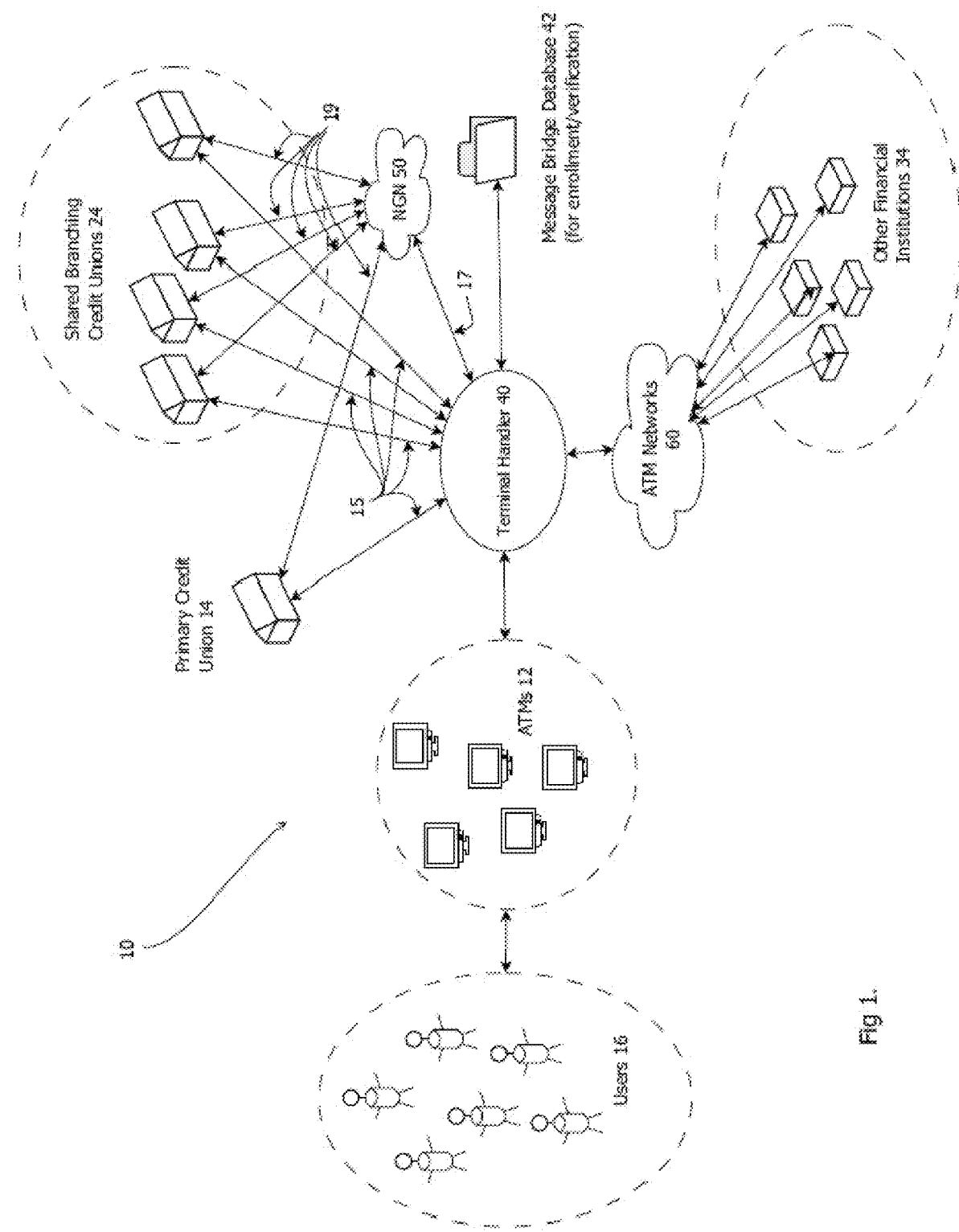
FIG. 1 is a flowchart illustrating one of the many embodiments of the present invention.

As indicated above, the inventions disclosed herein can be used in a broad range of applications and provide many benefits. As shown in FIG. 1, one embodiment of the system 10 of the invention preferably includes one or more ATMs 12 that belong to a primary credit union CU 14. One or more users 16 preferably can use the ATM or ATMs 12 to access accounts at a variety of financial institutions. The illustration of FIG. 1 is not intended to reflect a physical configuration of elements, but instead is to illustrate a process flow path for various aspects of the invention. For example, depending on the embodiment, the terminal handler 40 may be located on a server that also houses a switch (not shown) that facilitates electronic communication along the lines illustrated in FIG. 1.

Persons of ordinary skill in the art will understand that, for many of the inventive aspects described herein, the particular nature of the primary credit union 14 and the other financial institutions 24 and 34 can be any of a wide variety, including without limitation banks, credit unions, and others. For example, and as more fully explained below, even if the primary institution 14 and its networked affiliates 24 are all credit unions, the other financial institutions 34 may include credit unions as well, but ones that do not belong to the same network 50.

Preferably, the ATMs 12 include at least one that is a standard ATM whose hardware is fabricated and/or positioned to permit 24/7 access by users 16. Among others, these standard ATMs are of the type used in drive-through banking structures, stand-alone walk-up structures/kiosks, or the like.

Figure 2:
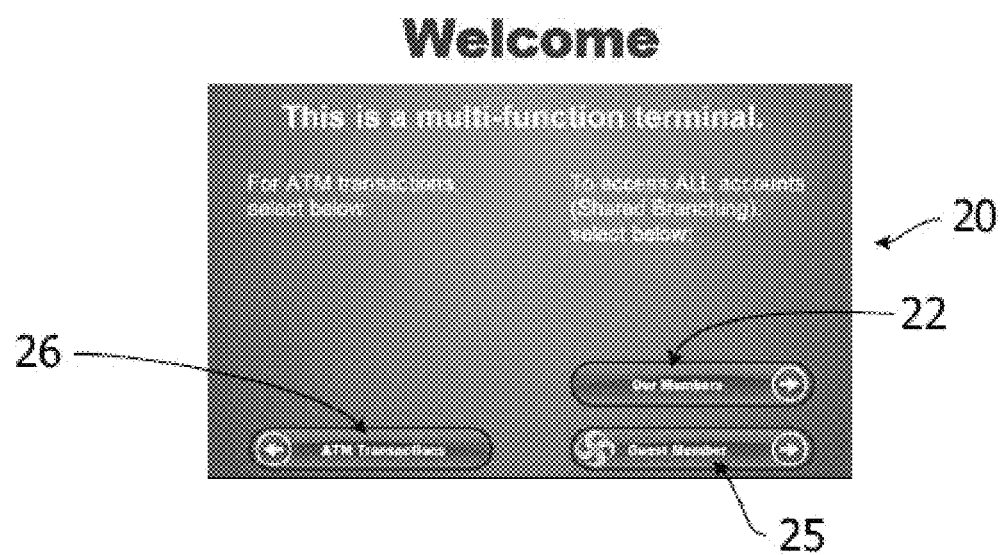
FIG. 2 illustrates one of the many embodiments of a user terminal display/interface of the invention.
Figure 3:
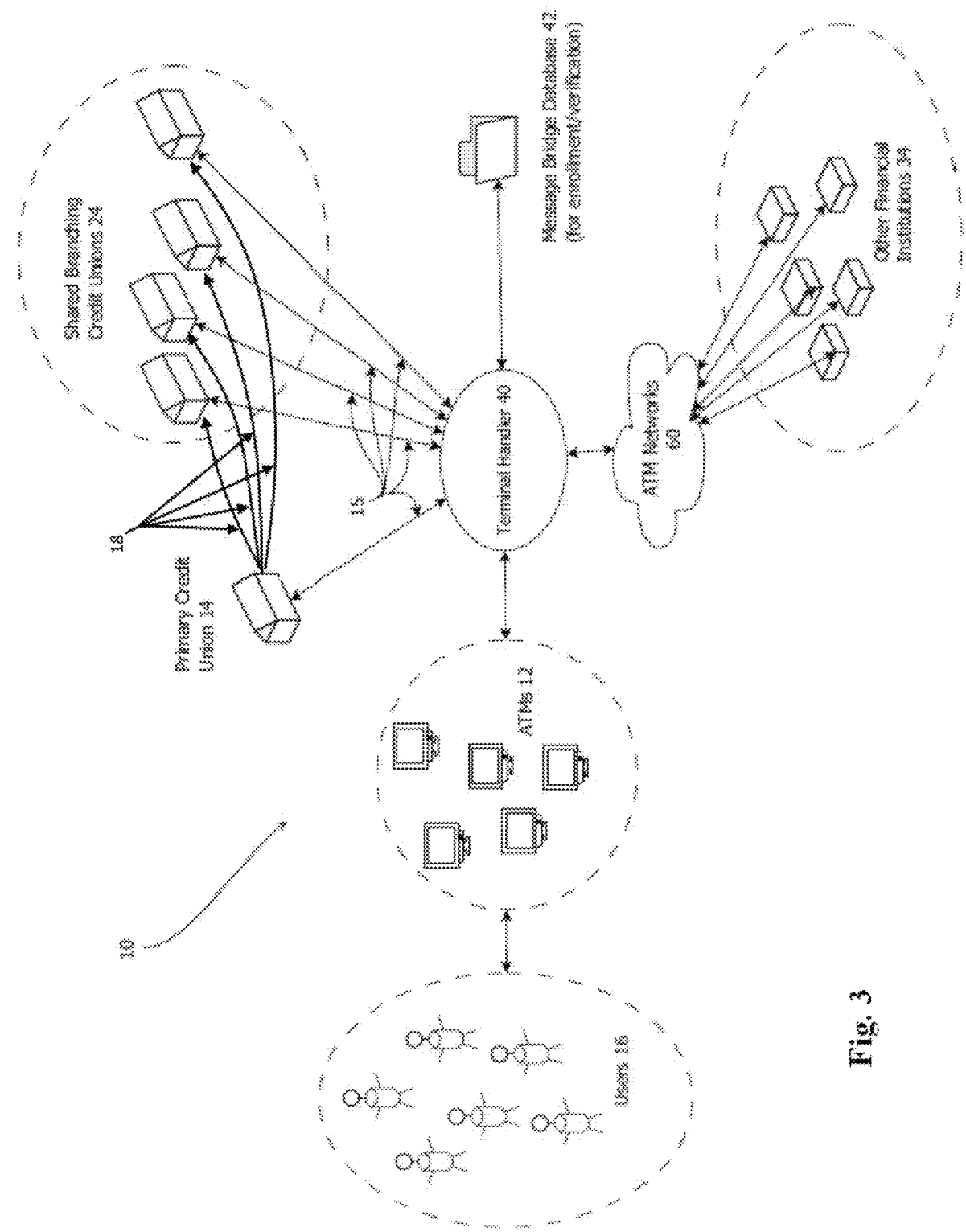
FIG. 3 is a flowchart similar to FIG. 1, but illustrating another of the many embodiments of the present invention.
Figure 4:
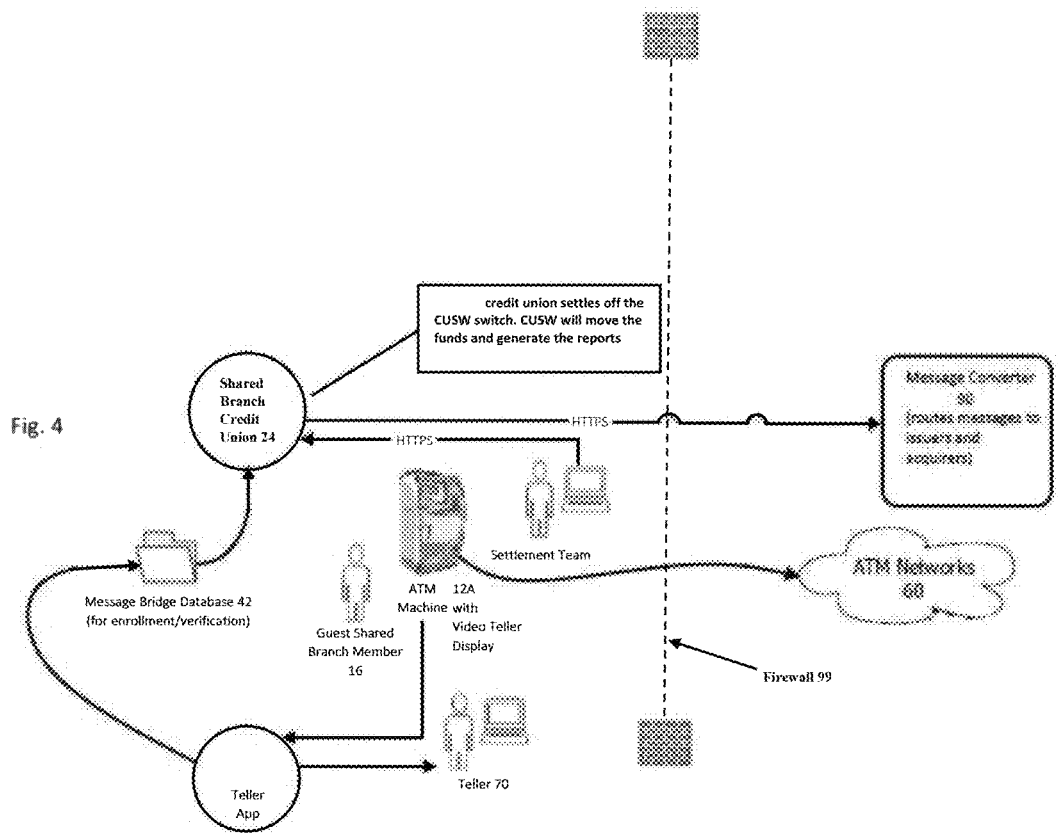
FIG. 4 is another flowchart similar to FIG. 1, but illustrating yet another of the many embodiments of the present invention.

Preferably, transactions and other communications and instructions ("TCI") between the users 16 and the ATMs 12 are handled by a terminal handler 40. For embodiments such as FIG. 1 (in which the primary institution 14 belongs to a group that includes other similar institutions such as credit unions 24), the terminal handler 40 preferably segregates the TCI and directs same to an appropriate processing channel or sub-system such as described below in connection with buttons 22, 25, and 26 in FIG. 2.

Preferably, and as indicated in FIG. 1, the network 50 functions as a communication link among a group of credit unions (typically ones who have contractually joined that group), and in addition to the ATM transactions discussed herein, that network 50 preferably can provide other functionality for users having accounts at any of the credit unions in the group (CUs 14 and 24 in FIG. 1). Such functionality includes, by way of example and not by way of limitation, remote account access (via mobile phones, personal computers, etc.).

That functionality also preferably includes the "original" networking between credits unions, commonly called "shared branching." Most credit unions historically have not had physical branches across most of the country—instead they have only a few (or even one) physical locations, and therefor can realistically only serve a small geographic area. To leverage their physical locations in a way that could better compete against large national banks and similar "bigger" competitors, at least some credit unions formed or joined a credit union "network" that permitted their members to physically go into any credit union that belonged to that "network" and conduct credit union business and transactions without extra charges, as if the member were at his own "home" credit union. This in effect allowed the individual members of the respective credit unions to have access to credit union services across broad areas of the country, including areas far from their own actual credit union, as well as locations that might simply more convenient for the individual members to visit (as compared to their "home" credit union location/s). This network/system is commonly referred to as providing "shared branches" to the relevant individuals who belong to those credit unions, and it required the development of computer linking and communication between the various credit unions in order to provide those services among the relevant group of credit unions.

In certain embodiments of the invention, the original computer network "shared branch" hardware 50 previously had evolved and been improved to provide to credit union members access to their individual accounts via personal computers, mobile telephones, and other devices. Preferably, the system 10 (including that network NGN 50 or some other such network) allows those individual credit union members to remotely conduct most or even all of the common "shared branching" transactions that an individual member conducts via a human teller in any of the physical facilities that belong to the "branch" network of credit unions. Relevant to the present invention, system 10 now provides the same or a similarly broad scope of accessibility to ATMs such as drive-through settings, walk-up installations, and others. Preferably, rather than providing to the user 16 a relatively limited access to the user's accounts (such as to only one or two main accounts—checking and savings, for example—and deposits and withdrawals to/from those accounts), the system 10 effectively presents to the user 16 the opportunity to conduct a much broader range of financial business (such as paying mortgages or other loans, monitoring balances and transferring funds among a much wider variety and number of accounts, etc.).

In certain embodiments, the system 10 also preferably provides its functionality via existing ATM hardware and other system elements, by simply updating the software that runs on that hardware. In one embodiment, that improved software of system 10 can present to the user 16 an interface similar to interface 20 shown in FIG. 2. The interface 20 preferably is provided to facilitate interactions by human users with their financial institutions. The interface is shown as a generally rectangular electronic display, with touch-screen buttons 22, 25, and 26 by which a user can launch an interactive session at the terminal. Persons of ordinary skill in the art will understand that characteristics of the interface 20 can be any of a wide variety and still permit the various embodiments of the invention to be practiced. By way of examples and not by way of limitation, the shape and operation and layout of interface 20 can be modified, such as to include more or fewer "buttons/options" such as elements 22, 25, and 26, and keyboard and/or voice interaction can be provided for the user's interaction with the ATM.

The embodiment of FIG. 1 involves three categories of transactions to be conducted at the ATM: (a) those for the primary credit union 14; (b) those for related financial institutions 24; and (c) those for foreign institutions 34. Preferably, the user can select which of those options to pursue by touching an appropriate button on the ATM's touchscreen:

Button 22—for "standard ATM" transactions made by one of the relevant credit union members 16 (a member of the primary institution 14 or the other credit unions 24) using the member's conventional ATM plastic card and PIN; these transactions preferably get routed by the terminal handler 40 to the relevant institution 14 or 24 via a relatively direct path such as represented by the respective lines 15;

Button 25—for "shared branch" transactions made by one of the relevant credit union members 16; these are the potentially more complicated transactions with a wider range of accounts and activities that can be accomplished on the 24/7 ATMS 12; preferably, they are routed from the terminal handler 40 to a shared branching network such as NGN 50, via a connection such as represented by line 17, and then by the NGN switch to the appropriate one of the group of credit unions 14/24, via lines 19; or Button 26—for transactions with other institutions 34; preferably, the TCI are routed from the terminal handler 40 to an ATM network 60. As also shown in FIG. 1, those foreign/other financial institutions' TCI are then processed to the respective foreign/other financial institution 34 in an appropriate manner.

As indicated above, persons of ordinary skill in the art will understand that voice commands or other actions can be used for that selection, or any other suitable technology can be used. Some embodiments may even use information stored in machine-readable form (such as in a microchip or magnetic stripe on a plastic card) to automatically select the appropriate option.

Like conventional banking customers, existing credit union members may receive from their respective financial institution one or more machine-readable plastic cards linked to one or possibly two of their accounts at that institution. Typically, and as described above, these cards already provide access through current ATMs to those specific linked accounts, for specific types of transactions (deposits, withdrawals, etc.). Preferably, that same functionality continues to be present in certain embodiments of the present invention. In addition, however, some embodiments of the present invention provide to the user 16 access to all or virtually all of the user's credit union accounts and services, and a message bridge database/server 42 (see FIG. 1) can be provided and used to "enroll" appropriate credit union members (those belonging to the institutions 14 and 24) so that they no longer have to use that dedicated account card. More specifically, the system 10 preferably allows appropriate users 16 to enroll and thereafter use any of a variety of machine-readable plastic cards or other secure indicia corresponding to the specific user 16 (a driver's license, face matching, fingerprint readers, face recognition, biometrics, digital wallet, one time pass code, personal identification number, other) to be able to access the desired broader range of accounts. Preferably, the message bridge database/server 42 (see FIG. 1) or a similar element can be used to verify whether a given form of identification already has been so "enrolled," so that upon uses subsequent to that initial enrollment, the user 16 can proceed directly to the user's desired ATM transactions rather than repeating the enrollment process.

Persons of ordinary skill in the art also will understand that the various components and functions of any particular embodiment of the system 10 can be any of a wide variety of hardware, software, or similar technology. Among others, Diebold, Inc. produces Opteva ATM machines and supplies Agilis software to run on its own and other manufacturers' ATMs, and those machines and that software are among those that can be utilized and/or modified to practice certain embodiments of the invention. Other manufacturers which make hardware that may be utilized and/or modified to practice the inventions may include NCR and Nautilus Hyosung, other. Also preferably, at least certain embodiments of the invention utilize the Interactive Financial eXchange (IFX) standard—an existing, platform independent messaging standard that has been embraced by the financial services industry. Other messaging platforms may be utilized with the inventions, such as API (Application Program Interface). In certain embodiments of the invention, other companies can provide the enrollment and verification database services 42. Preferably where it is possible to do so, certain embodiments use open source and commonly-adopted programming languages and conventions, such as HTML and XML.

Thus, certain embodiments of the invention extend "shared branching" functionality to credit union ATMs. The invention also can be used to leverage credit unions' existing investments in existing ATM terminals (such as Diebold Opteva models), while offering members credit union enhanced self-service capability (i.e., "shared branching" functionality) via 24/7 access to their accounts at those ATMs. Preferably, the invention is a software-only solution that empowers credit union members by giving them a broader rand of potential ATM transactions, while reducing workload for credit union tellers and reducing operating costs for credit union branches (via consolidated reporting processes using the terminal handler 40 instead of having to collect the ATM transaction data directly from the ATMs 12).

Since all of the ATM's financial transactions preferably are routed to the IFX terminal handler 40 or via API, the credit union 14 can process the transaction totals, reports, and settlement in a consolidated manner. Each ATM 12 preferably has one unique terminal ID. Balancing and settlement of each ATM therefore can be balanced to the consolidated totals and reports generated by IFX TH 40 or shared branching credit unions 24. Settlement to the financial institution is rolled up to the consolidated daily funds movement.

The relative affordability of certain embodiments of the invention can be illustrated by the following general specifications:

The Credit Unions 14/24 must use a relevant Shared Branching service provider.

Hardware:
  Diebold Opteva ATMs must be driven by that service provider via TCP/IP connections and meet the following minimum specifications:
  Pentium 4 1.8 GHz processor
  2 GB RAM
  80 GB hard drive
  Touch screen strongly recommended
Other Hardware Features
  Motorized or Dip card reader with Track 1 and Track 2 read capability (Dip card reader recommended)
  Encrypting PIN pad
  Envelope depository
  Single check (IDM5) or bulk check depositor y (IDMbd) Requirements
  Bulk Note cash acceptor (BNA) or Enhanced Note cash acceptor (ENA)
  Thermal receipt printer
  Advanced function cash dispenser
Software Requirements
  Microsoft Windows XP Pro operating system with service pack 3
  Diebold Agilis 3 IFX with Shared Branch Plug-In 1.0 service provider's ATM agent installed for uploading Electronic Journal (EJ) transactions and downloading financial institution's files to the ATMs
Other Software Features
  Remote encryption key loading
  Financial Institution Table (FIT) downloads
  EJ Upload XML
  Extensible Markup Language is designed to transport and store data
Switch/IFX*Terminal Handler 20
  Interactive Financial Exchange (IFX) is an open messaging specification that transmits financial data to ATMs and other devices.
Terminal Handler Tasks
  Route ATM and shared branch transactions
  Remote key entry
  Settlement totals
Routing Options for System 10
1. Standard ATM transactions
2. Shared branch transactions
Standard ATM Transactions preferably are processed on ATM Networks 60 (such as STAR, Pulse, VISA, MasterCard, etc.)
Shared Branch Transactions preferably are processed on a shared branch network such as NGN 50
TRANSACTION SETS on certain embodiments of the invention:
For ATM Transactions Type of Accounts
Access is limited to accounts linked to the user's actual ATM/Debit card.
Cash Withdrawal Checking, Savings, Other, Credit
Fast Cash Funding
Balance Inquiry Checking, Savings, Other, Credit
Check Deposit Checking, Savings, Other
Cash Deposit Checking, Savings, Other
Mixed Check/Cash Deposit Checking, Savings, Other
Transfer Checking, Savings, Other, Credit
Envelope Deposit Checking, Savings, Other, Credit
Check Payment (Single/Bulk) Other, Credit
Cash Payment (Single/Bulk) Other, Credit
Payment Enclosed Other, Credit
Mini-Statements Checking, Savings, Other
Purchase from Funding (Stamps) Funding
PIN Change Future phase—requires AP Cooperative
Open Account Relationship (OAR)
For Shared Branch Transactions Type of Account
Access to all account relationships.
Account Inquiry/Statement Print Share, Loan
Cash Withdrawal Share
Cash Withdrawal/Advance Loan
Check Deposit (Single/Bulk) Share
Cash Deposit (Single/Bulk) Share
Mixed Check/Cash Deposit Share
Transfer
Share to Share; Share to Loan; Loan to Share
Check Payment (Single/Bulk) Loan
Cash Payment (Single/Bulk) Loan
Check Withdrawal Future phase
Purchase (Stamps) Share Preferably, the procedure for a credit union customer 16 to execute a Shared Branching transaction on an ATM 12 of the present invention is very similar to using a conventional ATM. However, if the credit union member has not yet enrolled into the system of the invention, preferably the member must do so before using the ATM 12 for any shared branch type of access/transaction. To enroll, the member must provide to the ATM a series of different pieces of identifying information, to reduce the likelihood of fraud or other malfeasance. Depending on the particular embodiment of the invention, the ATM can be programmed to require that this information be entered manually, but preferably the ATM reads at least some pieces of the information from the magnetic stripe on the member's card (or via some other convenient method/apparatus). For example, the ATM may read from the card the credit union name and the user's membership or account number. In other embodiments, the member can be required to select a "shared branching" button on the ATM (which button may be labeled as "Home", "Guest", the relevant credit union name, or some other suitable identifier; see buttons 25 and 26 in FIG. 2), and then enter that information manually.

Preferably, the system then requires that the member 16 (in response to a prompt from the ATM 12) enter some other identifying and/or security information. Examples of the many types of such information include entering the member's last five (5) digits of their social security number, answering one or more security questions, having face or fingerprint (or other) recognition, personal identification number, one time passcodes, biometrics readings, scanning or reading of a digital wallet, etc. Other relatively low-tech examples include entering the street number of their address, their zip code, or a selected number of digits of a phone number associated with their card/account.

If the requested information and the information on the inserted card matches that on record in the message bridge database 42, the cardholder/user 16 is "approved" and thereafter is permitted to proceed with one or more "shared branch" type of financial transactions concerning the user's relevant accounts. If the request instead is declined, the ATM 12 ends the interactive session with the user 16.

In certain embodiments of the invention, a live teller feature may be provided within an ATM or kiosk. In such embodiments, the live teller function includes integrated two-way conferencing which supports live interaction of a user with a remote teller including audio and/or video conferencing. Such video conferencing channels are capable of supporting real-time shared branching via a video teller or as a self-service. In embodiments where shared branching account-based transactions occur, an Application Program Interface (API) functions to integrate the ATM/kiosk with the video teller in order to process such shared branching account-based transactions. The API integrates over the shared branch network and further may access the message bridge for member enrollment and authentication. Further, the API functions to connect the video teller application with the shared branch credit union which processes the shared branch transactions.

Shared branching account-based transactions which are capable of being performed through the video teller function include member verification, account inquiry, reverse lookup, withdrawals (cash, check, money orders, travelers checks), check and cash/coin deposits, check and cash loan payments, account and loan payment transfer, statement printing, and reversals, to name a few.

In embodiments where standard ATM transactions occur, the terminal handler functions to integrate the ATM/kiosk with the video teller to process those transactions over the ATM networks.

For the purpose of summarizing the invention, certain objects and advantages have been described herein. It is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The apparatus and methods of the invention have been described with some particularity, but the specific designs, constructions, and steps disclosed are not to be taken as delimiting of the invention. A wide range of modifications and alternative structures and steps for practicing the invention will make themselves apparent to those of ordinary skill in the art, all of which will not depart from the essence of the invention, and all such changes and modifications are intended to be encompassed within the appended claims.

What is claimed is:

1. An automated teller machine (ATM) associated with a primary credit union, the primary credit union included in a group of credit unions that are members of a shared branch network, said ATM comprising:
   (a) a terminal including:
      a card reader;
      an interface including a plurality of touch-screen buttons, wherein the plurality of touch-screen buttons include:
         a standard ATM button for standard ATM transactions,
         a shared branch button for shared branch-only transactions, wherein the shared branch-only transactions include transactions which are only conducted by a member of at least one credit union in the group of credit unions with at least one credit union in the group of credit unions,
      a processor, wherein said processor upon execution of software, is configured to:
         launch, via the interface including the plurality of touch-screen buttons, an interactive session and receive a selection of one of the plurality of touch-screen buttons, wherein:
            when the standard ATM button is selected by the member of the primary credit union or the member of another credit union in the group of credit unions,
               receive, via the card reader, an ATM card associated with the member of the primary credit union or the member of another credit union in the group of credit unions, respectively;
            when the shared branch button is selected by the member of said at least one credit union in the group of credit unions,
               receive an identification entered by the member of said at least one credit union in the group of credit unions in response to a prompt from the ATM to provide the identification, wherein said identification requires said member to enter (a) an account number associated with said member's credit union account, (b) an electronically readable card having said member's name associated therewith, and (c) a pin assigned to said member's credit union account,
               verify whether the member of said at least one credit union in the group of credit unions has previously enrolled to use shared branch services based on whether the identification matches a record in a message bridge database, when the member of said at least one credit union in the group of credit unions is verified, permit the shared branch transactions to proceed,
               and when the member of said at least one credit union in the group of credit unions is not verified, end the interactive session, (b) a terminal handler configured:
   when the standard ATM button is activated by the member of the primary credit union or the member of another credit union in the group of credit unions, to:
      route the standard ATM transactions to an ATM network, wherein the ATM network routes the standard ATM transactions to a financial institution associated with the ATM card provided by said member,
   when the shared branch button is selected by the member of said at least one credit union in the group of credit unions, to:
      route the shared branch-only transactions to the shared branch network, wherein the shared branch network routes the shared branch-only transactions to at least one credit union in the group of credit unions; and
(c) a live teller function which includes integrated audio and/or video conferencing which supports live interaction of a user with a remote teller.

2. The ATM-type device of claim 1, said live teller function including a two-way conferencing channel providing live interaction between a user and a remote teller.

3. The ATM-type device of claim 2, said conferencing channel capable of supporting said shared branch-only transactions in real-time.

4. The ATM-type device of claim 3, including an application program interface for connecting the live teller function with the at least one credit union for processing said shared branch-only transactions.

\* \* \* \* \*